(12) United States Patent
Zhou et al.

(10) Patent No.: US 8,104,976 B2
(45) Date of Patent: Jan. 31, 2012

(54) ADAPTIVE DEVICE FOR SHIFTING IMAGING AXIS ACROSS FIBER-OPTIC ENDFACES IN MULTI-FIBER CONNECTOR FOR INSPECTION

(75) Inventors: Ge Zhou, Renton, WA (US); Shangyuan Huang, Kent, WA (US)

(73) Assignee: Lightel Technologies Inc., Renton, WA (US)

( * ) Notice: Subject to any disclaimer, the term of this patent is extended or adjusted under 35 U.S.C. 154(b) by 441 days.

(21) Appl. No.: 12/464,861

(22) Filed: May 12, 2009

(65) Prior Publication Data

US 2010/0290744 A1    Nov. 18, 2010

(51) Int. Cl.
*G02B 6/36* (2006.01)
*G02B 6/00* (2006.01)
*G02B 21/00* (2006.01)
(52) U.S. Cl. ............. 385/89; 385/134; 385/90; 359/368
(58) Field of Classification Search .................... 385/89; 359/384
See application file for complete search history.

(56) References Cited

U.S. PATENT DOCUMENTS

| 6,751,017 | B2 | 6/2004 | Cassady |
| 6,879,439 | B2 | 4/2005 | Cassady |
| 7,239,788 | B2 * | 7/2007 | Villeneuve .................... 385/134 |
| 7,336,884 | B2 | 2/2008 | Zhou et al. |

* cited by examiner

*Primary Examiner* — Omar Rojas
(74) *Attorney, Agent, or Firm* — Pai Patenet & Trademark Law Firm; Chao-Chang David Pai

(57) ABSTRACT

A device for shifting the imaging axis of a microscope across the endfaces of a multi-fiber connector for inspecting the endfaces comprises: a supporting body attached to the optical tube of a microscope and having an extended portion; a swinging lever mounted at one end to the extended portion of the supporting body and rotatable on an axis perpendicular to the imaging axis of the microscope; a connection piece connecting between the swinging lever and a fitting tip; a bevel wheel fastened to the supporting body; and a torsion spring for pushing the swinging lever against a slanted surface of the bevel wheel. The bevel wheel is adapted to swing the swinging lever relative to the supporting body so that the imaging axis of the microscope is moved relative to the fitting tip to selectively align the imaging axis across the endfaces for inspection.

18 Claims, 11 Drawing Sheets

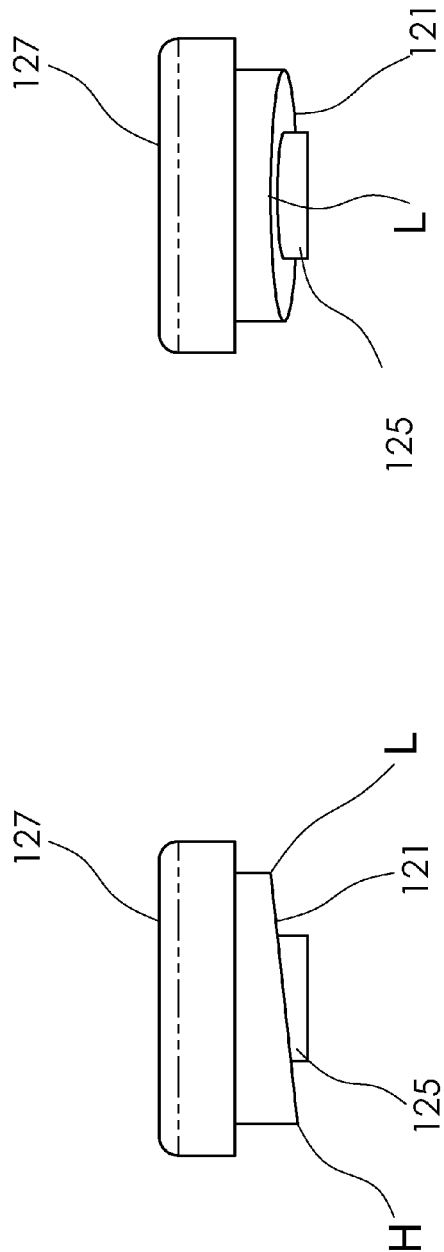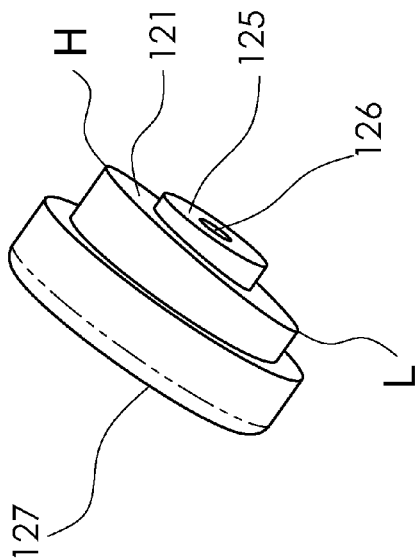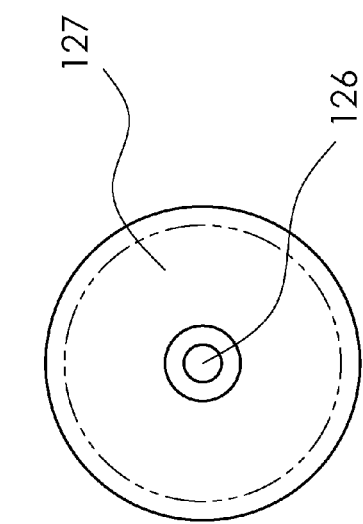
FIG. 5A
FIG. 5B
FIG. 5C
FIG. 5D

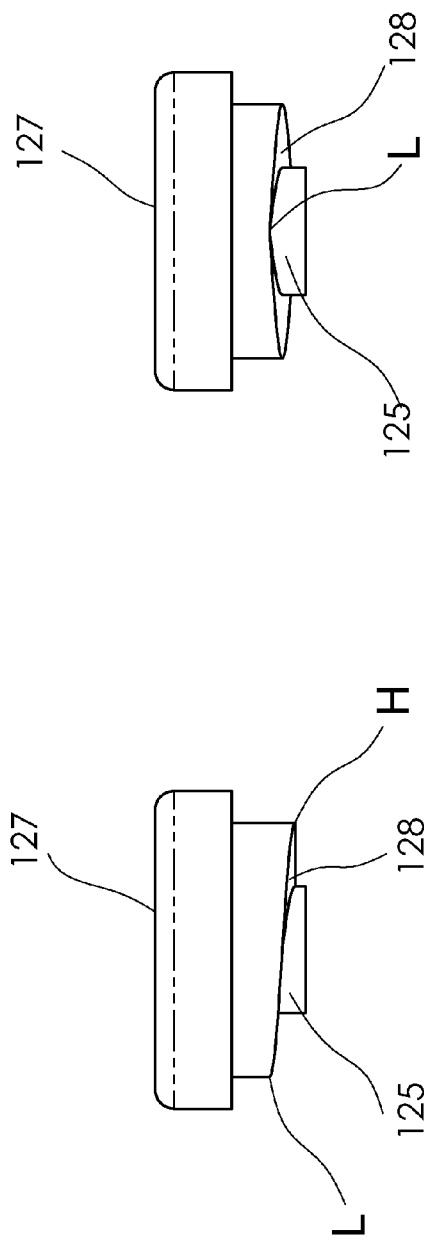
FIG. 6A
FIG. 6B
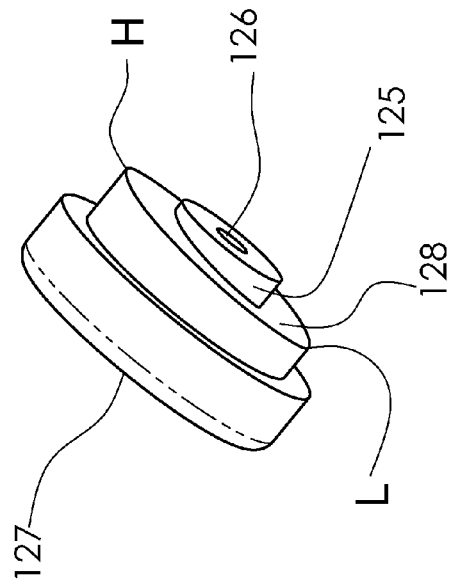
FIG. 6D
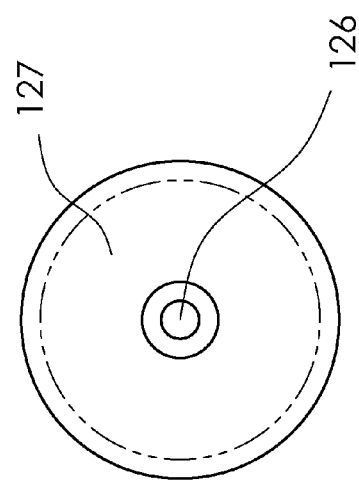
FIG. 6C

ADAPTIVE DEVICE FOR SHIFTING IMAGING AXIS ACROSS FIBER-OPTIC ENDFACES IN MULTI-FIBER CONNECTOR FOR INSPECTION

BACKGROUND OF THE INVENTION

1. Field of the Invention

The invention relates to fiber-optic connector inspection microscopes and more particularly to an adaptive device for shifting the imaging axis of a microscope across the endfaces of a multi-fiber connector for inspecting the fiber-optic endfaces through the microscope.

2. Description of the Related Art

The widespread implementation of fiber-optic communications for high-density interconnections has driven more and more multi-fiber connectors to be adopted in the industry. This creates an urgent need for regularly inspecting and maintaining the multi-fiber connectors in place, which are often situated behind backplanes or in locations which are very difficult to access.

It is well known in the fiber-optic communication industry that the endfaces of optical fibers within communication systems must be kept clean and undamaged, otherwise serious signal loss could result. The demand for cleanliness for fiber-optic endfaces has become even more stringent as the communication bandwidths increase and new communication technology requiring higher laser power is applied.

Many types of microscopes are already available for inspecting the endface of a fiber-optic connector to make sure the endface is undamaged and clean. Due to the need for sufficient magnification, the fiber-optic endface is typically inspected only one at a time. For example, the endface with a typical diameter of 0.125 mm can be inspected with a microscope with a field of view of about 0.3 mm×0.4 mm only one at a time. For a multi-fiber connector, with the centers of the fiber-optic endfaces spaced typically at 0.25 mm, the microscope must be able to scan from one side to the other side of the connector in order to inspect each of the fiber-optic endfaces. Therefore an adaptive device is needed to bring the fiber-optic endfaces one by one within the field of view of the microscope for inspection.

Cassady (U.S. Pat. Nos. 6,751,017 and 6,879,439) discloses a microscope for inspecting fiber-optic endfaces in a multi-fiber connector. The microscope comprises a tip capable of interfacing with the multi-fiber connector, a slider assembly, a slider chassis and a drive assembly, in which the driver assembly interfaced with the slider assembly is capable of selectively displacing the slider chassis along an axis of motion to selectively direct the imaging axis of the microscope between adjacent fiber-optic endfaces.

Zhou et al. (U.S. Pat. No. 7,336,884) discloses a different device for inspecting the fiber-optic endfaces through the microscope. The device comprises a supporting body; a pendular arm rotatably mounted to the supporting body; a fitting tip attached to the pendular arm allowing the imaging axis of the microscope to pass therethrough; and a bevel wheel fastened to the supporting body. The bevel wheel is adapted to swing the pendular arm relative to the supporting body so that the imaging axis of the microscope is moved relative to the fitting tip to selectively align the imaging axis between adjacent fiber-optic endfaces for inspection. However, with this device, the imaging axis of the microscope moves along a circular track relative to the fitting tip and as a result the imaging axis cannot be aligned with and focused on the center of every endface in a multi-fiber connector—since the endfaces in a multi-fiber connector are almost always arranged in a straight line.

Therefore, another design for the multi-fiber inspecting device is needed, wherein the imaging axis of the microscope is moved relative to the fitting tip in a straight line, so that the imaging axis can be adapted to align with the center of each and every endface in a multi-fiber connector.

BRIEF SUMMARY OF THE INVENTION

This invention provides a device for shifting the imaging axis of a microscope in a straight line across the endfaces of a multi-fiber connector for inspecting the fiber-optic endfaces through the microscope. The device is capable of bringing each fiber-optic endface of the multi-fiber connector one by one into the field of view of the microscope for inspection.

The adaptive device according to the present invention comprises a supporting body, a swinging lever, a connecting piece, a fitting tip, and an adjustment driver. The supporting body has one end attached to the optical tube of a microscope and has a backward extending portion off the imaging axis of the microscope. The swinging lever is rotatably mounted at one end to the backward extending portion of the supporting body, and connected at the other end to the connecting piece. The swinging lever is capable of swinging on a swinging axis that is perpendicular to the imaging axis. The connecting piece is connected to the fitting piece at a level for the imaging axis of the microscope to pass through an interior channel of the fitting tip. The fitting tip is designed to interface with a multi-fiber connector through a connector adaptor. The adjustment driver is disposed to interface with the supporting body and the swinging lever and is adapted to swing the supporting body relative to the swinging lever, thereby moving the imaging axis relative to the fitting tip along a straight-line. In other words, when the swinging lever is swung by the adjustment drive (e.g. in the form of a bevel wheel) relative to the supporting body, the imaging axis of the microscope will be shifted relative to the fitting tip in order to scan across the endfaces of a multi-fiber connector interfaced with the fitting tip.

In a preferred embodiment of the adaptive device according to the present invention, the adjustment driver is a bevel wheel rotatably mounted to the supporting body with a slanted or spiral surface facing the swinging lever; and a bulge is formed on a side of the swinging lever for contacting the slanted surface of the bevel wheel. As the bevel wheel turns, so does the slanted surface, pushing the swinging lever to swing to and fro relative to the supporting body due to the varying height around the slanted surface. As a result, the imaging axis may be selectively aligned with individual fiber-optic endfaces through the fitting tip.

BRIEF DESCRIPTION OF THE DRAWINGS

FIGS. 5A-5D show various views of the bevel wheel with a slanted surface for the adaptive device according to a preferred embodiment of the present invention.

FIGS. 6A-6D show various views of the bevel wheel with a spiral surface for the adaptive device according to another preferred embodiment of the present invention.

DETAILED DESCRIPTION OF THE INVENTION

Figure 1:
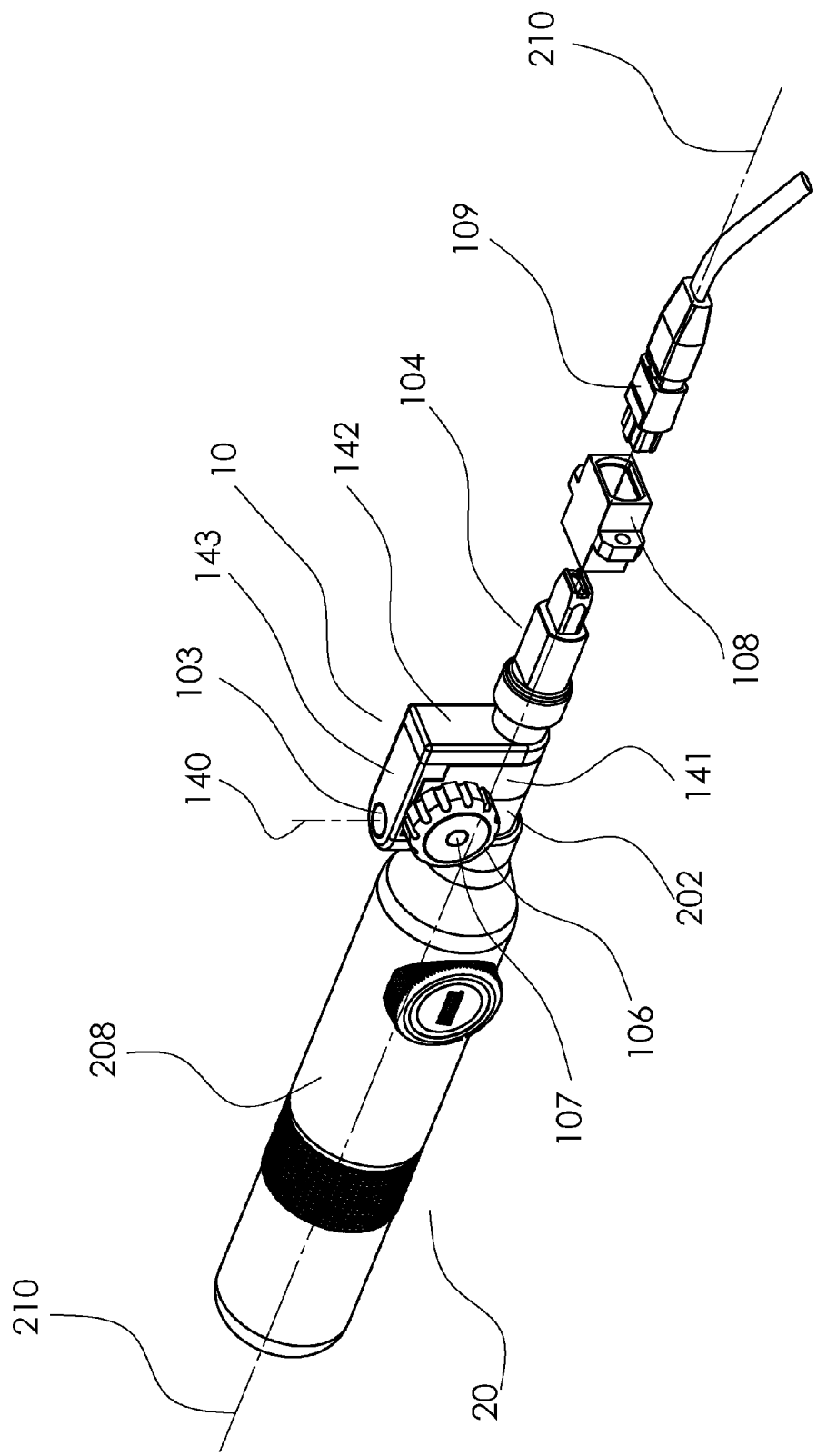
FIG. 1 illustrates the adaptive device for shifting the imaging axis of a microscope across the fiber-optic endfaces of a multi-fiber connector for inspecting the fiber-optic endfaces through the microscope according to a preferred embodiment of the present invention, together with a microscope, a multi-fiber connector and a connector adaptor.

FIG. 1 illustrates the adaptive device 10 for shifting the imaging axis of a microscope across the fiber-optic endfaces of a multi-fiber connector for inspecting the fiber-optic endfaces according to a preferred embodiment of the present invention. In FIG. 1, the adaptive device 10 is shown together with a handheld microscope 20, a multi-fiber connector 109 and a connector adaptor 108. The microscope 20 has a microscope body 208 and an optical tube 202 at the front end of the microscope body 208. In addition, the imaging axis 210 of the microscope 20, which passes through the center of the field of view of the microscope 20, is also shown in FIG. 1.

Figure 2A:
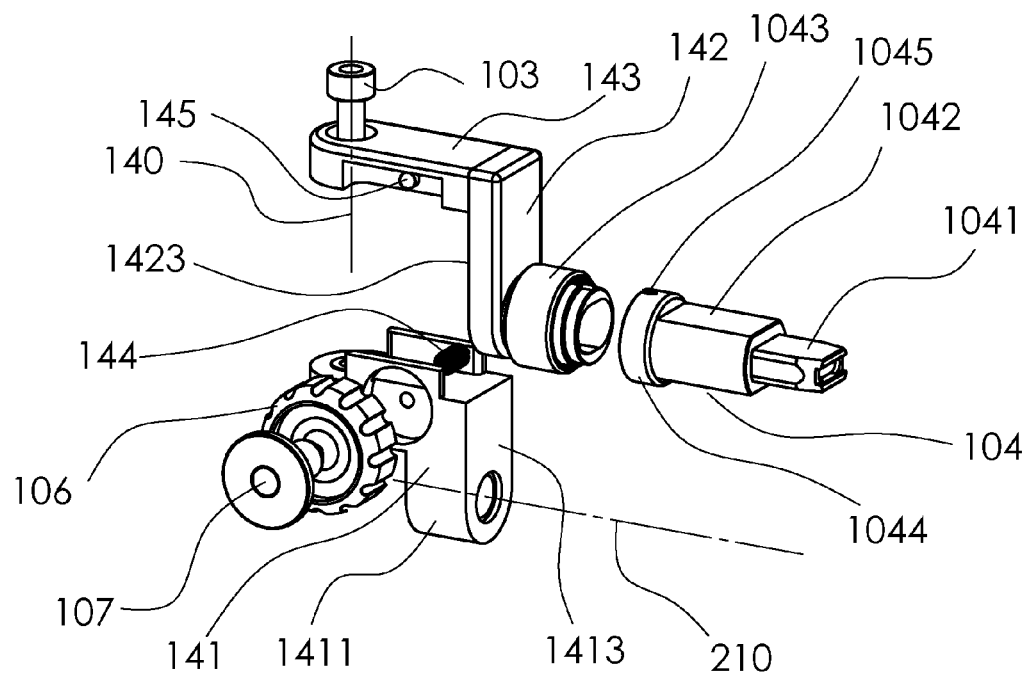
FIG. 2A and FIG. 2B show two exploded views of the adaptive device shown in FIG. 1.
Figure 2B:
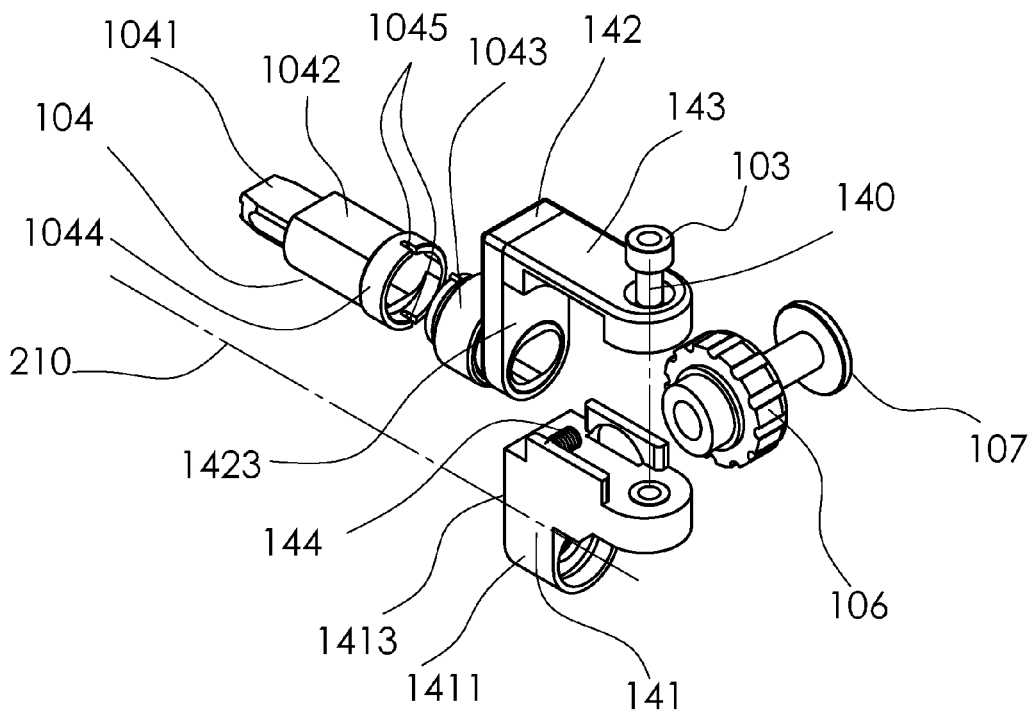
Figure 3A:
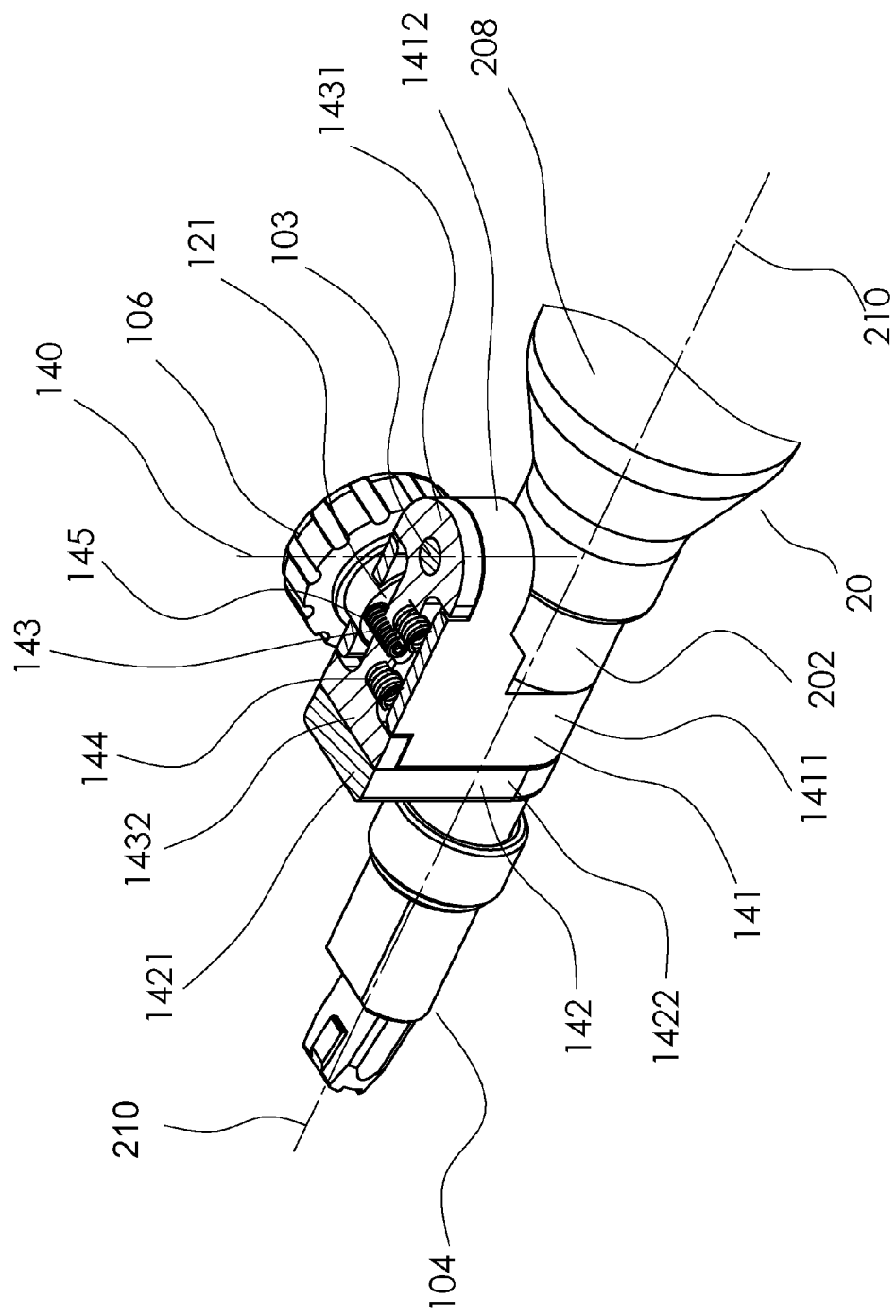
FIG. 3A and FIG. 3B show a perspective view and a top plan view, respectively, of the assembled adaptive device in FIG. 2 with a top section of the swinging lever removed to illustrate the interaction among its internal components.
Figure 3B:
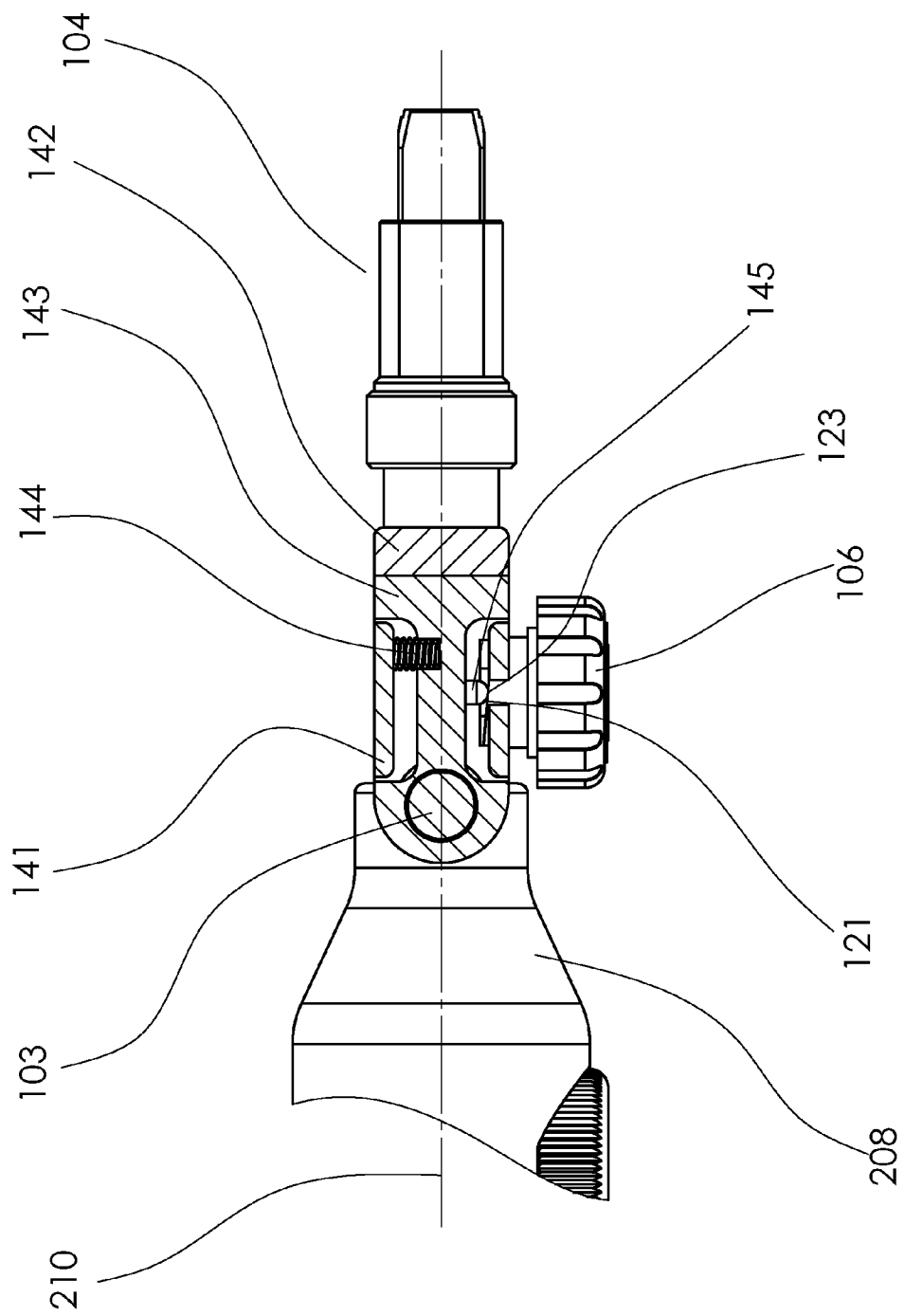

FIG. 2A and FIG. 2B show two exploded views of the adaptive device 10 in FIG. 1. FIG. 3A and FIG. 3B show a perspective view and a top plan view, respectively, of the assembled adaptive device 10 with a top section of the swinging lever 143 removed to illustrate the interaction among its internal components. As illustrated in FIGS. 1~3, the adaptive device 10 comprises a supporting body 141, a swinging lever 143, a connecting piece 142, a fitting tip 104, a spring 144, and a bevel wheel 106. Each of these components will be described in detail in the following.

The supporting body 141 has a first portion 1411 for receiving the optical tube 202 of the microscope 20 and a second portion 1412 disposed off the optical tube 202 of the microscope 20 and toward the rear of the microscope body 208. The swinging lever 143 has a first end 1431 and a second end 1432 away from the first end 1431 in a forward direction. The first end 1431 of the swinging lever 143 is rotatably mounted to the second portion 1412 of the supporting body 141. The swinging lever 143 is rotatable relative to the supporting body 141 about a swinging axis 140 that is perpendicular to the imaging axis 210 of the microscope 20. The connecting piece 142 has a first end 1421 fixedly connected to the second end 1432 of the swinging lever 143 and a second end 1422 extending toward the imaging axis 210 of the microscope 20. Thus, when the swinging lever 143 swings around the swinging axis 140, the connecting piece 142 will shift sideways relative to the supporting body 101 and the optical tube 202.

The fitting tip 104 has an interior channel and is attached at one end to the second end 1422 of the connecting piece 142. The fitting tip 104 is designed such that it is capable of interfacing with a multi-fiber connector 109 through a connector adaptor 108. When the swinging lever 143 swings relative to the supporting body 101, the fitting tip 104 also swings relative to the optical tube 202 (and therefore the imaging axis 210) of the microscope 20, thus allowing the imaging axis 210 to pass through the interior channel of the fitting tip 104 to be selectively aligned with a certain fiber-optic endface in the multi-fiber connector 109 for inspection.

In this embodiment, the swinging lever 143 has a flat top and is substantially parallel to the optical tube 202 of the microscope 20; the connecting piece 142 is flat and is disposed at a substantially right angle with the flat top of the swinging lever 143. However, the swinging lever 143 and the connecting piece 142 are not limited to these shapes or relative angles between the two, as long as the swinging axis 140 is perpendicular to the imaging axis 210 and substantially on the same plane as the imaging axis 210. In fact, the swinging lever 143 and the connecting piece 142 can be integrally formed (in one piece) or they can be formed in two pieces and physically joined or connected together. They are separately named in the description of the invention only as a matter of convenience, not as a matter of necessity.

The interior channel of the fitting tip 104 is preferably parallel to the imaging axis 210 so that when the fitting tip 104 swings with the swinging lever 143, the imaging axis 210 will remain at the same level within the interior channel of the fitting tip.

As shown in FIGS. 1~3, the swinging lever 143 is mounted on the supporting body 141 with a bolt or shaft 103. However, any other hinging means known in the art would also work. Moreover, the supporting body 141 as shown in the drawings has a vertical (i.e. relative to the optical tube) front surface 1413 extending from the first portion 1411 and the connecting piece 142 has a corresponding vertical rear surface 1423 facing the front surface 1413 of the supporting body 141. However, they are not limited to these configurations as long as the two are substantially close to each other without obstructing the swinging of the connecting piece 142.

As shown in FIG. 2, the bevel wheel 106 is mounted on a wheel shaft 107 fastened through a center hole 126 to a side of the supporting body 141. The structure of the bevel wheel 106 is further illustrated in FIGS. 5A-5D. FIG. 5D is a perspective view of the bevel wheel 106, which has on its inner side a center portion 125 enclosing the center hole 126 and an annular slanted surface 121 around the center portion 125. The center portion 125 projects further than the highest point H—as measured from the outer side 127 of the bevel wheel 106—of the slanted surface 121 so that the bevel wheel 106 is allowed to turn freely around the wheel shaft 107. FIG. 5A shows a lateral elevation view of the bevel wheel 106, showing the highest point H and the lowest point L of the slanted surface 121. FIG. 5B shows another lateral elevation view of the bevel wheel 106, showing in the middle the lowest point L of the slanted surface 121. FIG. 5C shows a plan view of the bevel wheel 106 from the outer side 127. Admittedly, the structure of a bevel wheel as described above and other functional equivalents are well-known to one of ordinary skill in the relevant art. Therefore, no further description is needed.

Figure 4:
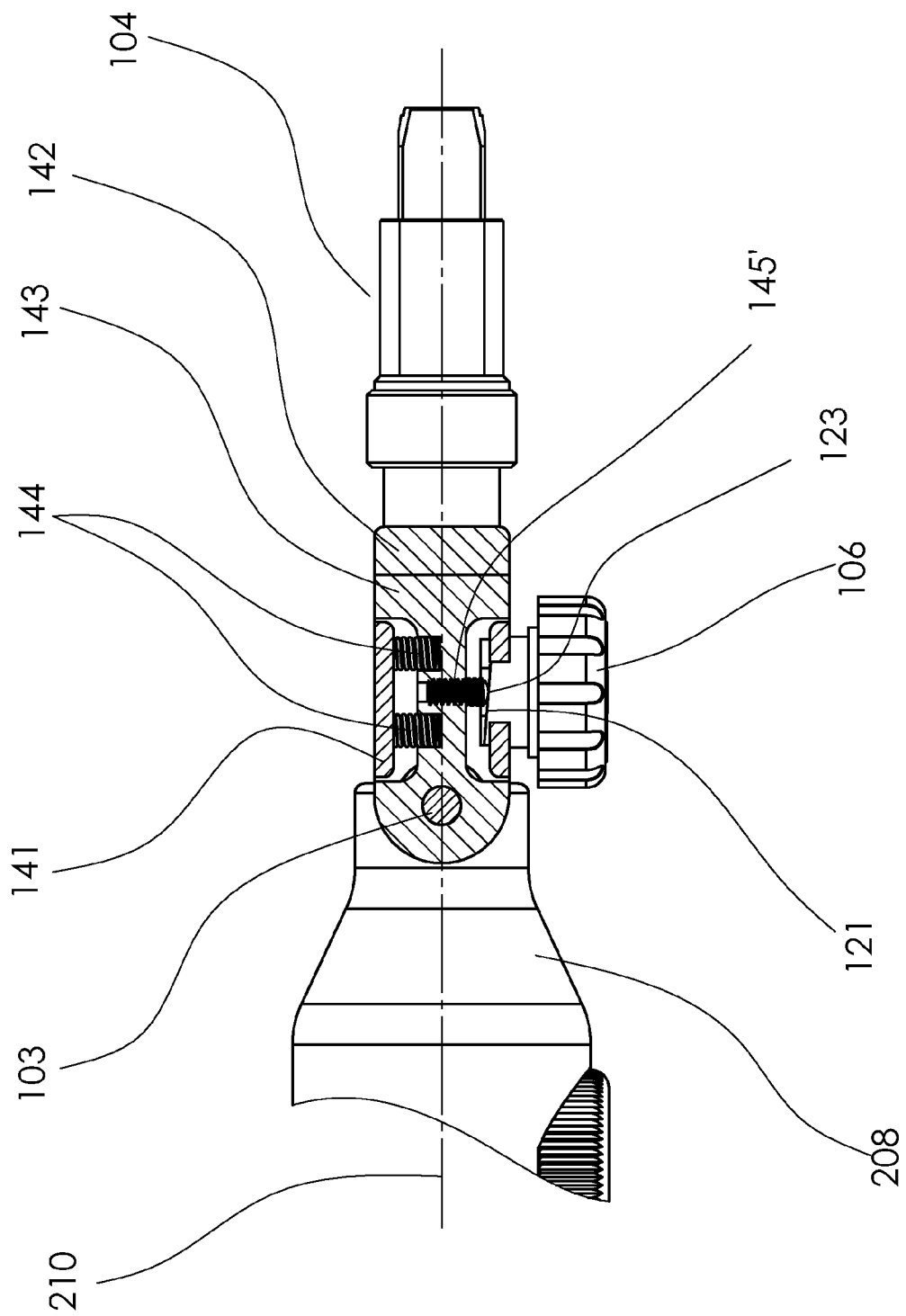
FIG. 4 shows another design the internal components of the adaptive device in accordance with the present invention.

As shown in FIGS. 3A and 3B, a bulge 145 is formed on an internal wall of the swinging lever 143. The bulge 145 is in contact with the slanted surface 121 of the bevel wheel 106 at a point 123. One torsion spring 144 is disposed between the top side of the supporting body 141 and the swinging lever 143 to constantly exert an elastic force to push the swinging lever 143 towards the slanted surface 121 of the bevel wheel 106 relative to the supporting body 141, thus pushing the bulge 145 against the slanted surface 121 of the bevel wheel 106. In FIGS. 3A and 3B, one torsion spring 144 is shown, however, embodiments with more than one torsion spring (as illustrated in FIG. 4) or with other biasing means known in the relevant art would also function properly. Moreover, instead of forming a bulge on the internal side of the swinging lever 143, a screw 145' can be fixed through the internal wall so that the head of the screw 145' will act as a bulge against the slanted surface 121 of the bevel wheel 106. This approach is also illustrated in FIG. 4. This approach allows the bulge height to be set during the individual device assembling so as to ensure that the imaging axis 210 will be aligned to the center of the connector when the swinging lever 143 is at a certain desired position, which is normally (but not necessarily) halfway between its leftmost position and the rightmost position.

When the bevel wheel 106 is turned around the wheel shaft 107, the point of contact 123 between the slanted surface 121 of the bevel wheel 106 and the bulge 145 on the swinging lever 143 will travel along a circular path on the slanted surface 121 and be shifted back and forth relative to the base of the slanted surface 121. Thus, the swinging lever 143 and therefore the fitting tip 104 will be swung to and fro, against the force exerted by the torsion spring 144, relative to the supporting body 141. As a result, the fitting tip 104 will be swung from side to side relative to the imaging axis 210 of the microscope 20 attached to the supporting body 141.

Figure 7A:
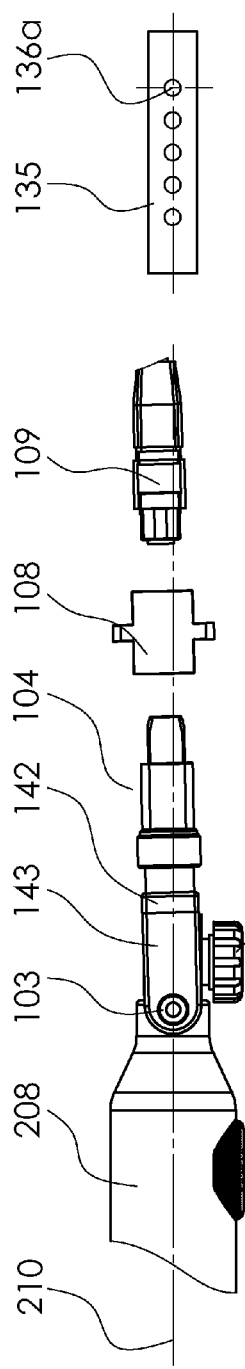
FIGS. 7A-7C show three positions of the swinging lever and the fitting tip relative to the imaging axis as the bevel wheel is turned.
Figure 7B:
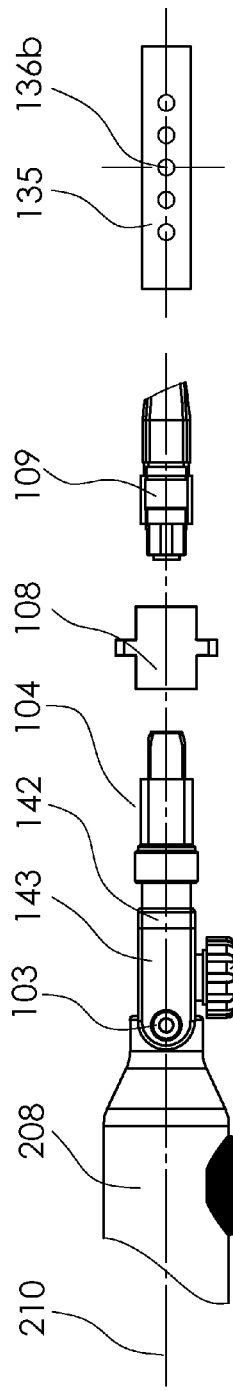
Figure 7C:
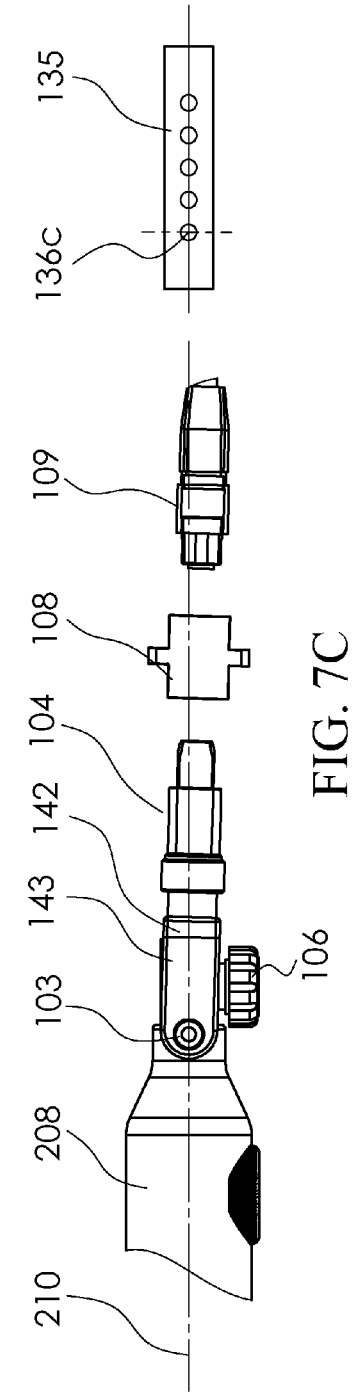

FIGS. 7A-7C show three positions of the swinging lever 143 and the fitting tip 104 relative to the imaging axis 210, as viewed from the top side of the swinging lever 143 and the corresponding positions of the endface in line with the imaging axis 210 as viewed from the microscope side. The endfaces are arranged in a straight line on the front wall 135 of the multi-fiber connector 109. Each of the three positions corresponds to a different angular position of the slanted surface 121. As shown in FIG. 7A, when the point of contact 123 between the slanted surface 121 and the bulge 145 is at the highest point H of the slanted surface 121, the fitting tip 104 is at its leftmost point relative to the imaging axis 210. In most situations, when the fitting tip 104 is connected, probably through a connector adaptor 108, to the stationary multi-fiber connector 109, the supporting body 141 (and thus the imaging axis 210) is actually shifted to the rightmost point so that the rightmost fiber-optic endface 136a in the multi-fiber connector 109 can be inspected. It is understood that the imaging axis 210 does not have to be shifted to the rightmost position to inspect the rightmost endface 136a. Depending upon the span of the fiber-optic endfaces to be inspected, an adaptive device 10 with a sufficient shifting range should be chosen so that the outermost endfaces can be brought into view. As shown in FIG. 7C, when the point of contact 123 is at the lowest point L of the slanted surface 121, the fitting tip 104 is at its rightmost point, and the leftmost fiber-optic endface 136c in the multi-fiber connector can be examined. When the point of contact 123 is at an intermediate height, as illustrated in FIG. 7B, the fitting tip 104 is at a corresponding intermediate point for inspecting the center endface 136b in the multi-fiber connector 109. Note that the imaging axis 210 is shifted from side to side relative to the fitting tip 104 along a straight-line track passing through the two outermost endfaces 136a and 136c as the bevel wheel 106 is turned around. More specifically, the imaging axis 210 is shifted from the leftmost point to the rightmost point as the bevel wheel 106 is turned a half round (180°), and from the rightmost point back to the leftmost point as the bevel wheel 106 is turned 180° again.

When the slanted surface 121 of the bevel wheel 106 is flat, as in FIGS. 5A-5D, the angle by which the bevel wheel 106 is turned does not have a linear relationship with the height of the slanted surface 121 at the point of contact 123. Namely, to achieve a given amount of change in the height of the slanted surface 121, thus shifting the imaging axis 210 by a given distance, the bevel wheel 106 will have to be turned by a different angle. The nonlinearity is undesirable and can be corrected by a bevel wheel 106 with a spiral slanted surface 128, as shown in FIGS. 6A-6D. The spiral slanted surface 128 is formed such that the height of the surface at the point of contact 123 changes linearly with the angle by which the bevel wheel 106 is turned. As a result, the imaging axis 210 will be shifted evenly across the fiber-optic endfaces as the bevel wheel 106 with the spiral slanted surface 128 is being turned.

Figure 8:
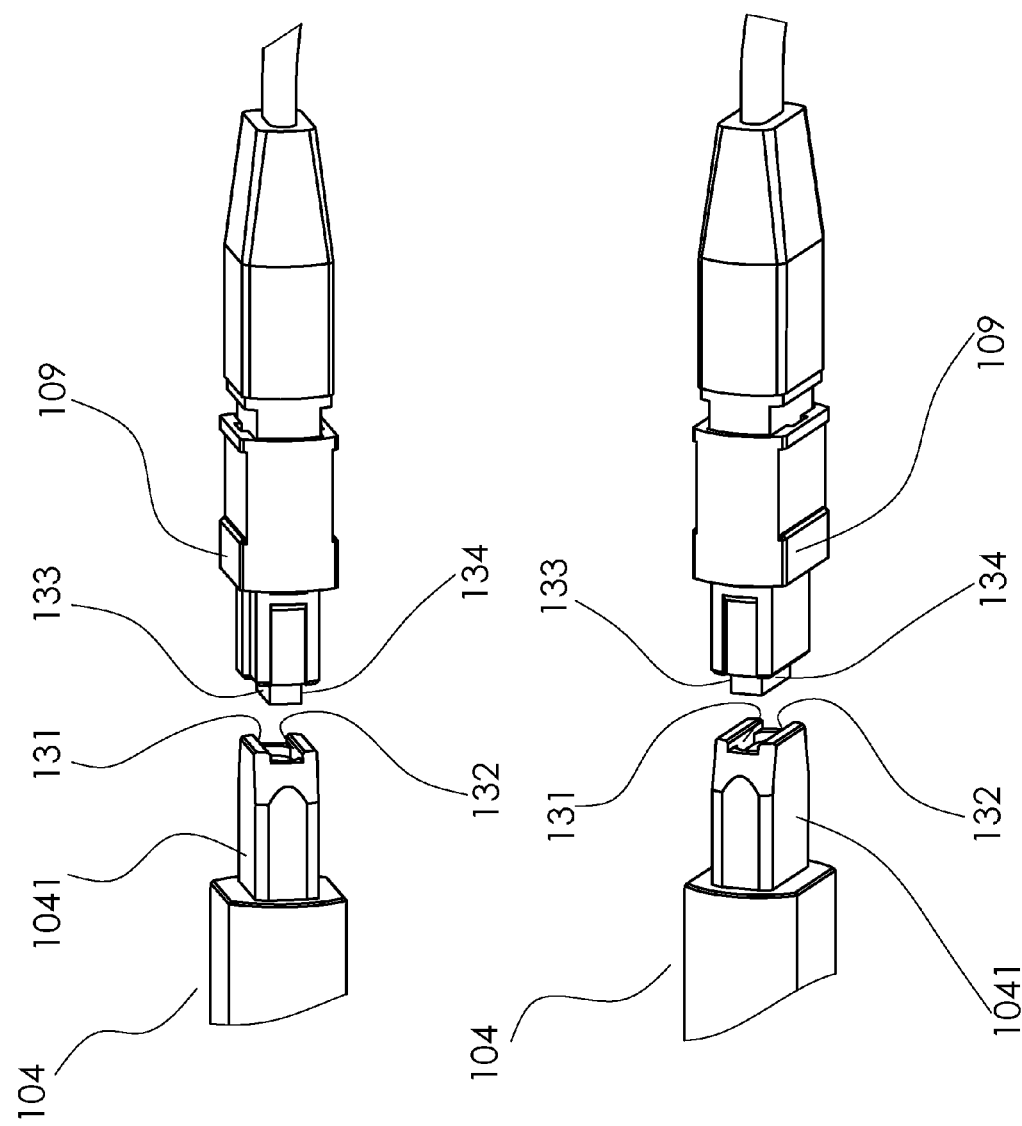
FIG. 8 illustrates an improved interface between the fitting tip of the adaptive device shown in FIG. 1 and a multi-fiber connector inside a connector adaptor.

FIG. 8 illustrates an improved interface between the fitting tip 104 and a multi-fiber connector 109 inside a connector adaptor 108. (Note that, in order to clearly show the interfacing between 104 and 109, the adaptor 108 is not shown in FIG. 8.) In connection, the fitting tip 104 is inserted into one end of the connector adaptor 108 and the multi-fiber connector 109 is inserted into the other end of the connector adaptor 108 for the two to interface with each other. However, due to the relatively loose tolerance of the inner structure of adaptors 108, the connection is usually not firm enough and the fitting tip 104 and the multi-fiber connector 109 may go out of alignment inside the connector adaptor 108, making it very difficult to align the imaging axis 210 with the fiber-optic endfaces. To prevent this, the fitting tip 104 is shaped to have a recessed front end for tightly mating with the facing end of the multi-fiber connector 109. As a result, the inside top surface 131 and the inside bottom surface 132 of the recessed mouth of the fitting tip 104 will be in tight contact respectively with the top surface 133 and the bottom surface 134 of the facing tip of the multi-fiber connector 109.

Figure 9A:
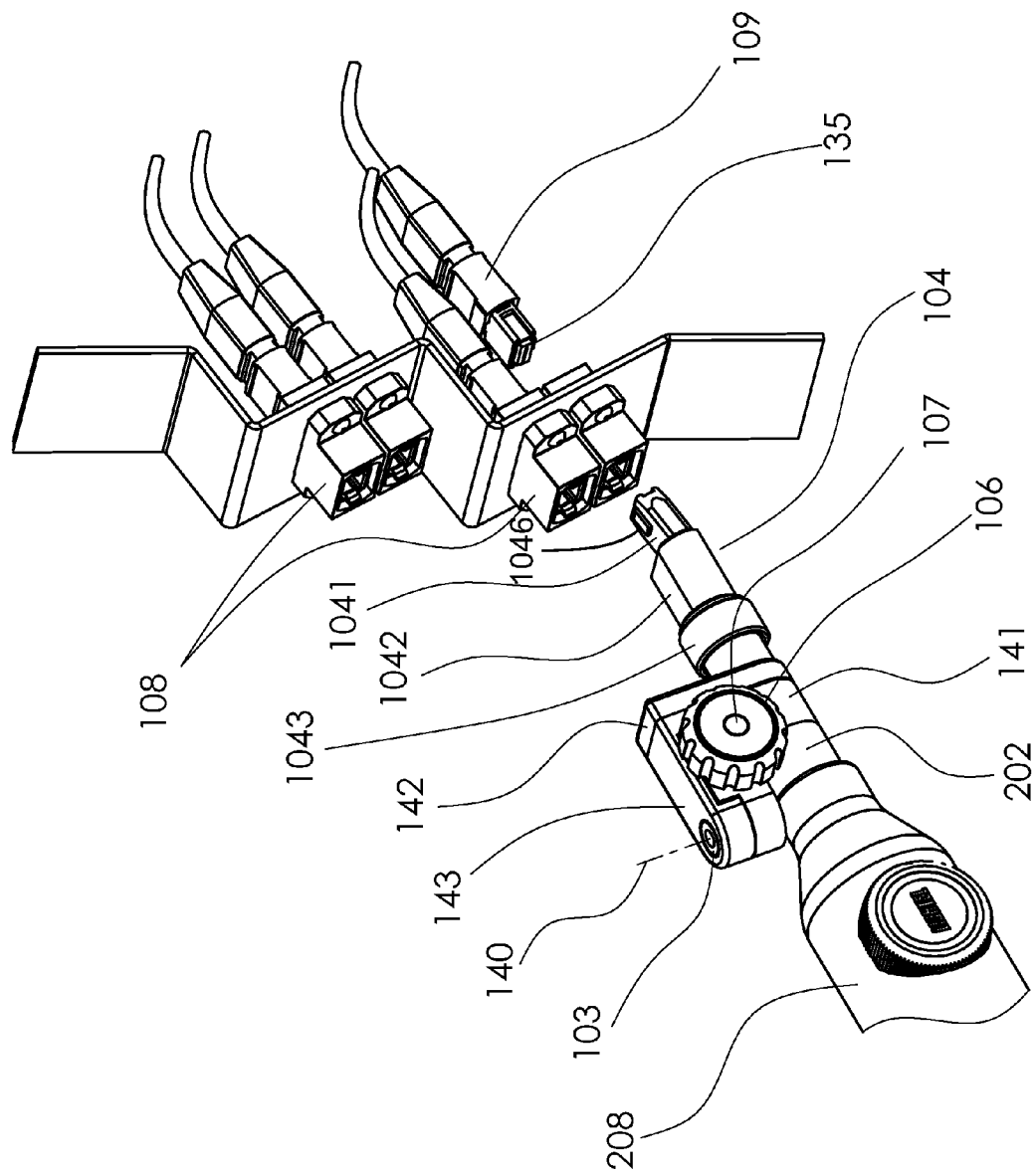
FIG. 9A and FIG. 9B illustrate another interface between the fitting tip of the adaptive device shown in FIG. 1 and a multi-fiber connector inside a connector adaptor, wherein the front portion of the fitting tip is tilted at a small angle with the imaging axis.
Figure 9B:
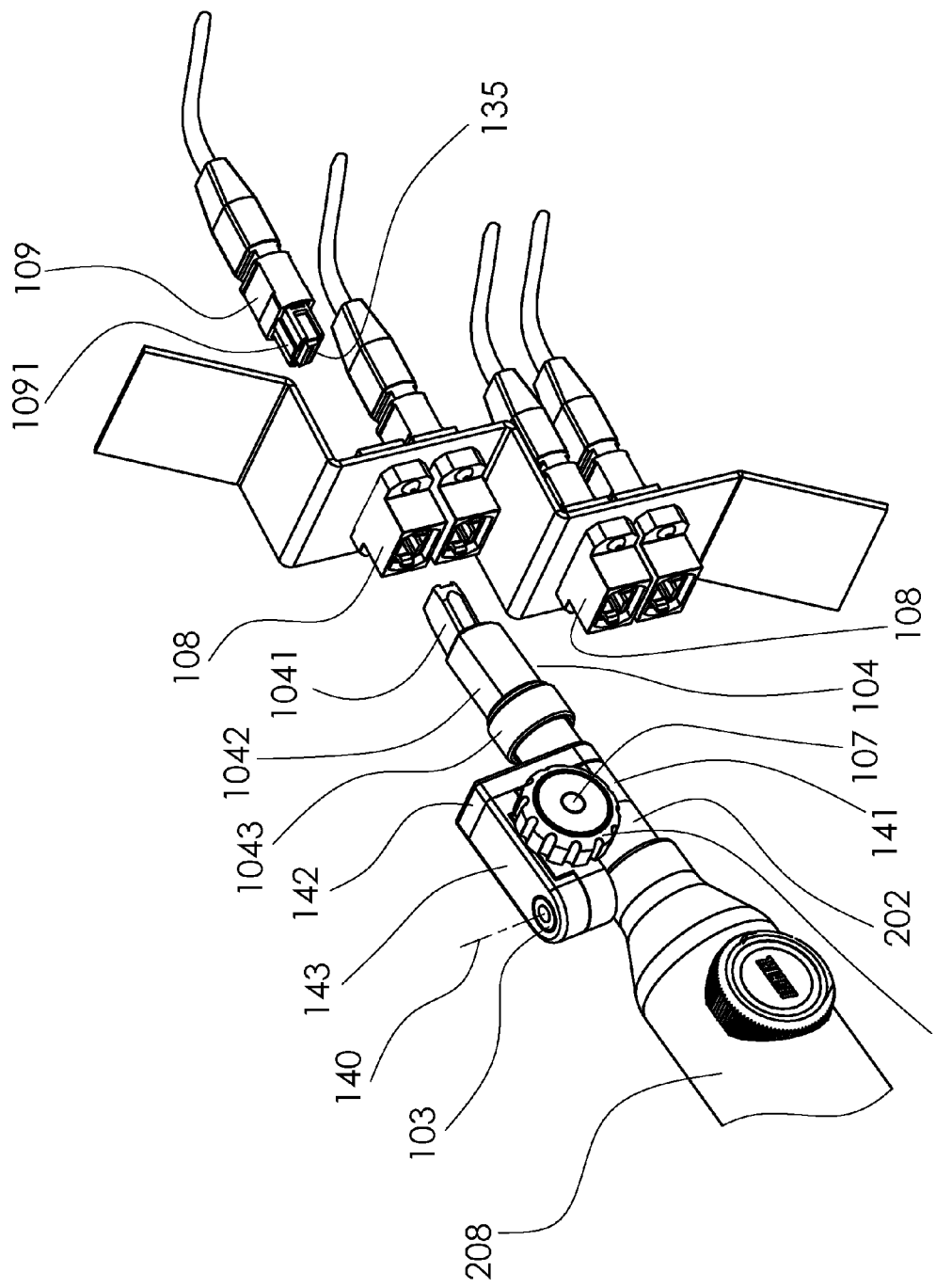

FIGS. 9A and 9B illustrate another interface design between the fitting tip 104 of the adaptive device and a multi-fiber connector 109 inside a connector adaptor 108, which is intended for APC-type of multi-fiber connectors whose front wall 135 is tilted at a certain angle, commonly 8 degrees. In this design, the fitting tip 104 has a front portion 1041 that is tilted up or down from the imaging axis 210 at the same angle as the front wall 135 of the multi-fiber connector 109. Thus, the imaging axis 210 will be perpendicular to the endfaces so that the best overall image can be obtained.

As shown in FIG. 9B, there is a side key 1091 in the tip side of the multi-fiber connector 109 for orientation control when mating connectors. For APC-type multi-fiber connectors, the side key 1091 is usually on the longer side which is joined with the tilted wall 135. FIGS. 9A and 9B illustrate two different connector installations with opposite connector orientation: the connector endfaces in FIG. 9A are slightly facing up and those in FIG. 9B are slightly facing down. Therefore, when the fillting tip 104 is connected with the connector adaptor 108, the microscope body 20 is slightly tilted down or slightly tilted up, respectively.

Considering the nonstandardized connector orientations at the operation site as well as the usually small space clearance near the microscope, the fitting tip 104 is designed to be able to flip relative to the connecting piece 142 (and the rest of the adaptive device 10 and therefore the microscope 20) by 180 degrees thus allowing more operational flexibility. This ability to flip is important especially when the front portion 1041 of the fitting tip 104 has a side key 1046 on one side for unidirectionally connecting to the connector adaptor 108, as shown in FIG. 9A. An embodiment capable of such flipping is illustrated in FIGS. 2A and 2B. As shown, the middle portion 1042 of the fitting tip 104 is separated from the rear portion of the fitting tip 104 and has a male threaded portion 1044 with two directly opposite cuts 1045 at one end thereof; the fitting tip 104 further has a tightening ring 1043 with a corresponding female threaded portion around the rear portion of the fitting tip 104; and the rear portion of the fitting tip 104 has two projections corresponding to the two cuts 1045 of the middle portion 1042 so that the middle portion 1042 and the rear portion of the fitting tip are mated when the two projections are mated with the two cuts 1045. Further, when the tightening ring 1043 is tightened, the middle portion 1042 and the rear portion are tightly connected; when the tightening ring is loosened, the middle portion 1042 can be separated from the rear portion of the fitting tip 104. Of course, this is only an illustrative embodiment; other embodiments can be devised to allow the fitting tip 104 to flip relative to other components of the adaptive device 10. It goes without saying that the rear portion of the fitting tip 104 as described above can be physically part of the connecting piece 142. That construction should be considered patentably equivalent to the one described here.

In the foregoing analysis, the swinging lever 143, the connecting piece 142, and the fitting tip 104 are swung altogether "relative to" the optical tube 202 of the microscope 20, therefore relative to the imaging axis 210. Thus, the swinging lever 143, the connecting piece 142, and the fitting tip 104 may be altogether stationary while the imaging axis 210 is swung, or vice versa. For example, when the multi-fiber connector 109 to be inspected is physically fixed in position (e.g. when the multi-fiber connector 109 is installed behind communication system backplates), the swinging lever 143, the connecting piece 142, and the fitting tip 104 will be fixed in position while the optical tube 202 and the imaging axis 210 are swung to and fro. On the other hand, if the multi-fiber connector 109 is movable, then the swinging lever 143, the connecting piece 142, and the fitting tip 104 can be swung to and fro. After all, it is the relative position between the two that determines which of the fiber-optic endfaces is aligned with the imaging axis 210.

When the imaging axis 210 is shifted across the fiber-optic endfaces, the distance from the endfaces to the lens of the microscope 20 will change slightly. This minor effect can be easily compensated for by refocusing the image of each endface. In addition, the effect can also be minimized by lengthening the distance between the endfaces and the swinging axis 140 by extending the second portion 1412 of the supporting body 141 as far back as possible in the direction of the microscope body 208.

The invention is not to be limited to the exact structure shown in the accompanying drawings or described in the specification as various changes in the details of construction may be resorted to without departing from the spirit of the invention.

What is claimed is:

1. A device for shifting the imaging axis of a microscope across fiber-optic endfaces of a multi-fiber connector for inspecting the fiber-optic endfaces through the microscope, the device comprising:
    (a) a supporting body having a first portion for receiving an optical tube of the microscope and a second portion disposed off the optical tube of the microscope;
    (b) a swinging lever having a first end rotatably mounted to the second portion of the supporting body and a second end away from the first end in a forward direction, wherein the swinging lever is rotatable relative to the supporting body about a swinging axis that is perpendicular to the imaging axis of the microscope;
    (c) a connecting piece having a first end fixedly integrally formed with or connected to the second end of the swinging lever and a second end disposed toward the optical tube of the microscope;
    (d) a fitting tip having an interior channel attached to the second end of the connecting piece, such that the imaging axis of the microscope passes through the interior channel of the fitting tip and the fitting tip is capable of interfacing with a multi-fiber connector;
    (e) a biasing means disposed between the supporting body and the swinging lever for rotationally biasing the swinging lever relative to the supporting body; and
    (f) an adjustment driver disposed to interface with the supporting body and the swinging lever and is adapted to swing the supporting body relative to the swinging lever, moving the imaging axis of the microscope relative to the fitting tip along a straight-line track to selectively align the imaging axis across the fiber-optic endfaces of the multi-fiber connector interfaced with the fitting tip.

2. The device of claim 1, wherein the biasing means comprises a torsion spring.

3. The device of claim 2, wherein the adjustment driver comprises a bevel wheel with a slanted surface.

4. The device of claim 3, wherein the slanted surface of the bevel wheel is flat or spiral.

5. The device of claim 3, wherein the bevel wheel is rotatably fastened to the supporting body; and a bulge is formed on a side wall of the swinging lever for contacting the slanted surface of the bevel wheel.

6. The device of claim 3, wherein the swinging lever has a flat top substantially parallel to the optical tube of the microscope; and the connecting piece is flat and disposed at a substantially right angle with the flat top of the swinging lever.

7. The device of claim 3, wherein a front end of the fitting tip is shaped for tightly mating with a front end of the multi-fiber connector.

8. The device of claim 3, wherein a front portion of the fitting tip is tilted at an angle from the imaging axis of the microscope attached to the device.

9. The device of claim 3, wherein part or all of the fitting tip is capable of flipping by 180 degrees relative to the connecting piece.

10. The device of claim 3, wherein the fitting tip comprises a middle portion, a rear portion separated from the middle portion, and a tightening ring sleeved over the rear portion; the middle portion has a male threaded portion with two cuts facing the rear portion; the rear portion has two projections for mating with the two cuts at the male threaded portion of the middle portion; and the tightening ring has a female threaded portion for threading with the male threaded portion of the middle portion for tightening and loosening.

11. The device of claim 1, wherein the adjustment driver comprises a bevel wheel with a slanted surface.

12. The device of claim 11, wherein the slanted surface of the bevel wheel is flat or spiral.

13. The device of claim 11, wherein the bevel wheel is rotatably fastened to the supporting body; and a bulge is formed on a side wall of the swinging lever for contacting the slanted surface of the bevel wheel.

14. The device of claim 11, wherein the swinging lever has a flat top substantially parallel to the optical tube of the microscope; and the connecting piece is flat and disposed at a substantially right angle with the flat top of the swinging lever.

15. The device of claim 11, wherein a front end of the fitting tip is shaped for tightly mating with a front end of the multi-fiber connector.

16. The device of claim 11, wherein a front portion of the fitting tip is tilted at an angle from the imaging axis of the microscope attached to the device.

17. The device of claim 11, wherein part or all of the fitting tip is capable of flipping by 180 degrees relative to the connecting piece.

18. The device of claim 11, wherein the fitting tip comprises a middle portion, a rear portion separated from the middle portion, and a tightening ring sleeved over the rear portion; the middle portion has a male threaded portion with two cuts facing the rear portion; the rear portion has two projections for mating with the two cuts at the male threaded portion of the middle portion; and the tightening ring has a female threaded portion for threading with the male threaded portion of the middle portion for tightening and loosening.

* * * * *